United States Patent [19]

Sano

[11] Patent Number: 4,566,709
[45] Date of Patent: Jan. 28, 1986

[54] STEERING SYSTEM FOR VEHICLES

[75] Inventor: Shoichi Sano, Tokyo, Japan

[73] Assignee: Honda Giken Kogyo Kabushiki Kaisha, Tokyo, Japan

[21] Appl. No.: 659,323

[22] Filed: Oct. 10, 1984

[30] Foreign Application Priority Data

Oct. 17, 1983 [JP] Japan .................... 58-193663

[51] Int. Cl.$^4$ ............................................. B62D 7/00
[52] U.S. Cl. ..................................... 280/91; 180/170
[58] Field of Search ................... 280/91, 96, 707; 180/140, 141, 142, 143, 170, 172; 74/571 L, 831, 834, 836

[56] References Cited

U.S. PATENT DOCUMENTS 4,105,086  8/1978  Ishii et al. ................. 280/91
4,265,337  5/1981  Dammeyer .................... 180/170
4,313,514  2/1982  Furukawa et al. ............. 280/91

FOREIGN PATENT DOCUMENTS 26363  2/1984  Japan .

Primary Examiner—Joseph F. Peters, Jr.
Assistant Examiner—Ross Weaver
Attorney, Agent, or Firm—Irving M. Weiner; Joseph P. Carrier; John J. Cantarella

[57] ABSTRACT

A steering system for vehicles in which the steered angle ratio (k) of a rear wheel (20) to a front wheel (7) is controllable by a control means (31) in accordance with the vehicle speed ($u_1$), and the correction of the steered angle ratio in accordance with the vehicle speed ($u_1$) is permitted under a predetermined condition only.

The steering system has a speed control mechanism (35, 35) connected to the control means and controlled therewith, so that the vehicle speed ($u_1$) is decreased or held constant when the relative deviation ($u_1-u_2$) between the vehicle speed ($u_1$) the vehicle actually has and a vehicle speed ($u_2$) converted from the steered angle ratio (k) the vehicle actually has is larger than a predetermined value [$f(u_1)$].

7 Claims, 8 Drawing Figures

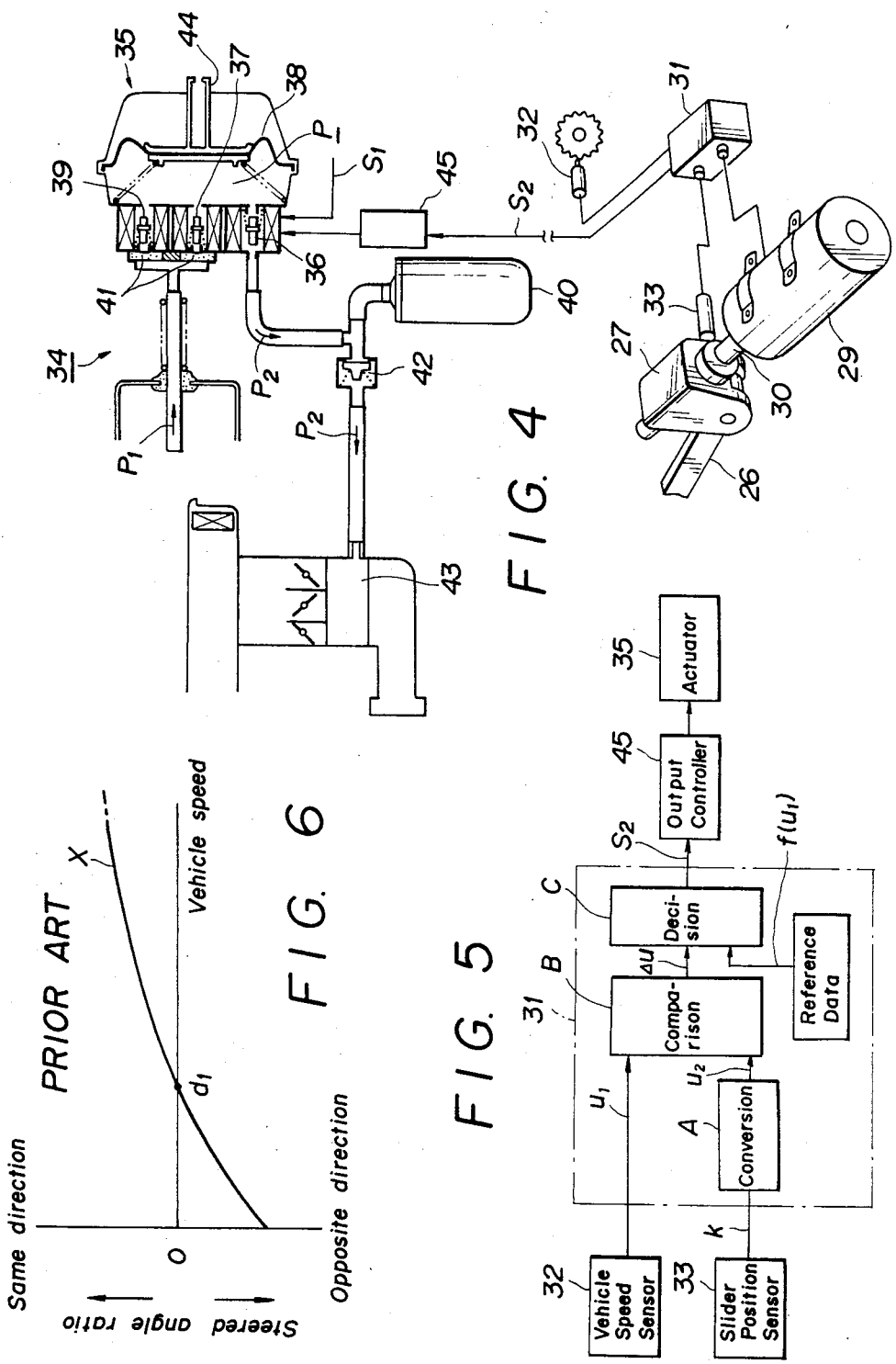

STEERING SYSTEM FOR VEHICLES

BACKGROUND OF THE INVENTION

1. Field of the Invention

The present invention relates to a steering system for vehicles of the type in which a rear wheel is steerable in relation to the steering operation of a front wheel, and more particularly, to a steering system for vehicles in which the steered angle ratio of a rear wheel to a front wheel is variable in accordance with the vehicle speed.

2. Description of Relevant Art

There has already been proposed a steering system for vehicles, in which the steered angle ratio of a rear wheel to a front wheel is variable in accordance with the vehicle speed, and more particularly, in which the rear wheel is steered, at relatively low vehicle speeds, in the opposite direction to the front wheel or substantially at an angle of zero degree and, at relatively high vehicle speeds, in the same direction as the front wheel, as shown in FIG. 6 of the accompanying drawings (Japanese Laid Open Application JP-A-59-26363 dated Feb. 10, 1984).

In such a steering system, as the vehicle speed is decreased with a steering wheel held at a constant steering angle when the vehicle is turning at a high speed in a steering mode in which a rear wheel is steered in the same direction as a front wheel, the steered angle of the rear wheel correspondingly decreases, resulting in a varying difference between the steered angles of the front and rear wheels, whereby the turning radius of the vehicle becomes smaller.

Incidentally, most ordinary vehicles with an unsteerable rear wheel are set so as to have what is called an understeer characteristic which, as the vehicle speed is increased with a steering wheel held at a constant steering angle to raise the stability in high-speed travelling, enlarges the turning radius. Also, in such an ordinary vehicle with an understeer characteristic, the turning radius becomes smaller, as the vehicle speed is decreased while the vehicle is turning.

However, in those vehicles equipped with a steering system in which the steered angle ratio of a rear wheel to a front wheel is variable in accordance with the vehicle speed, such an understeer characteristic appears to be more effective than in the ordinary vehicle in which the rear wheel is unsteerable.

With such point in mind, in order to improve a steering system for vehicles of the above-proposed type, the present applicant has filed on Oct. 17, 1983 a Japanese Patent Application No. SHO58-193661, to thereby provide a steering system for vehicles in which the correction of the steered angle ratio of a rear wheel to a front wheel is permitted only when the vehicle is in a substantially straight travelling condition.

Incidentally, in such steering system, because of the restricted correction of the steered angle ratio of a rear wheel to a front wheel, there may appear a relatively large relative deviation between the steered angle ratio the vehicle actually has and a converted steered angle ratio corresponding to the actual vehicle speed, or in other words, there may be caused a relatively large relative deviation between the vehicle speed the vehicle actually has and a converted vehicle speed corresponding to the actual steered angle ratio.

In this respect, the present invention has been achieved to further improve a steering system for vehicles of the type described above.

SUMMARY OF THE INVENTION

According to the present invention, there is provided, in a steering system for vehicles, in which a rear wheels is steerable in relation to the steering operation of a front wheel, and the steered angle ratio of the rear wheel to the front wheel is controlled in accordance with the vehicle speed, an improvement comprising a deviation detecting means for detecting the relative deviation between the steered angle ratio the vehicle actually has and a steered angle ratio set in accordance with the vehicle speed, and a speed control means for controlling to decrease or hold constant the vehicle speed when the above-said relation deviation is larger than a predetermined value.

Moreover, according to the present invention, there is provided, in a steering system for vehicles including a steering wheel, a front wheel, a front steering means for steering the front wheel, a rear wheel, a rear steering means for steering the rear wheel, a ratio changing means for changing the steered angle ratio of the rear wheel to the front wheel, a control means for controlling the ratio changing means, a ratio detecting means for detecting the steered angle ratio, the ratio detecting means cooperating with the control means, and a speed detecting means for detecting the vehicle speed, the speed detecting means cooperating with the control means. The rear wheel is steered at relatively low vehicle speeds in the opposite direction to the front wheel or substantially at an angle of zero degree and at relatively high vehicle speeds in the same direction as the front wheel, and the correction of the steered angle ratio in accordance with the vehicle speed is permitted only when the vehicle is in a substantially straight travelling condition. The improvement according to the invention comprises a speed control mechanism operatively connected to the control means and controlled therewith, so that the vehicle speed is reduced or held constant when the relative deviation between the vehicle speed the vehicle actually has and a converted vehicle speed obtained from the steered angle ratio the vehicle actually has is larger than a predetermined reference value.

Accordingly, an object of the present invention is to provide a steering system for vehicles, in which, even when a condition setting is made such that a relative difference appears between the steered angle ratio the vehicle actually has and a steered angle ratio set in accordance with the vehicle speed, a proper steering operation can be maintained.

The above and further features, objects and advantages of the present invention will become apparent from the following detailed description of the preferred embodiments of the invention when the same is read in conjunction with the accompanying drawings.

BRIEF DESCRIPTION OF THE DRAWINGS

FIG. 4 is a constitutional illustration of a control part of the steering system of FIGS. 1, 2, and 3a to 3c.

FIG. 5 is a functional block diagram of the control part of FIG. 4.

FIG. 6 is a graph showing a steered angle ratio characteristic between a front wheel and a rear wheel of a conventional steering system.

DETAILED DESCRIPTION OF PREFERRED EMBODIMENTS

Figure 1:
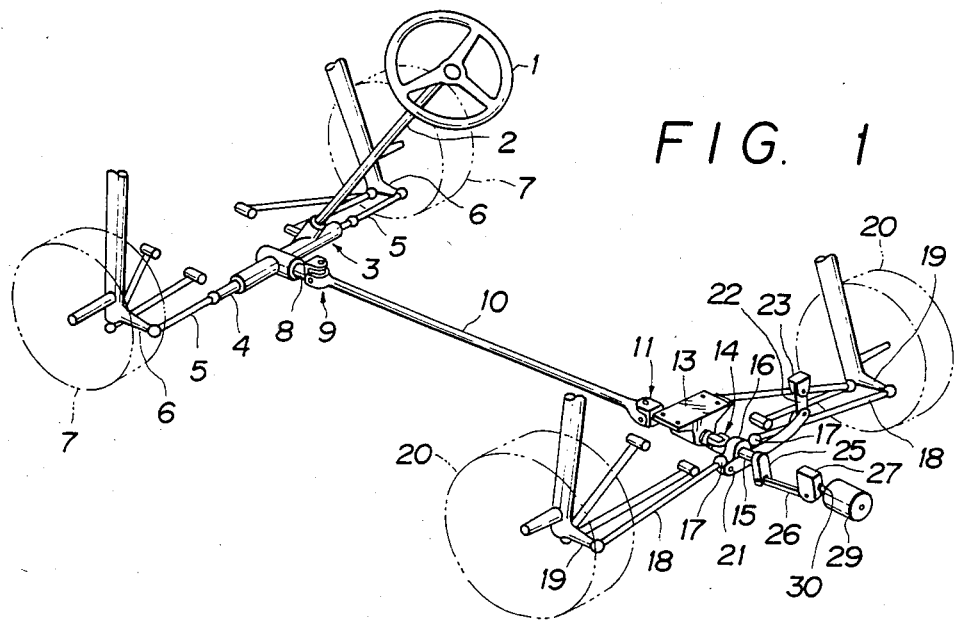
FIG. 1 is a schematic perspective view showing a basic structure of a vehicle equipped with a steering system according to the preferred embodiment of the invention.
Figure 2:
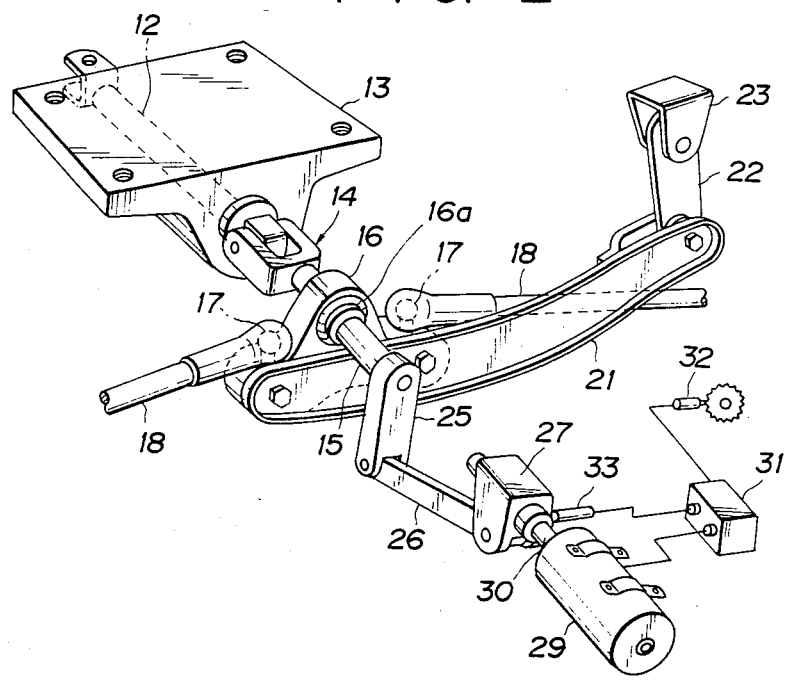
FIG. 2 is an enlarged perspective view of a rear wheel steering mechanism of the steering system of FIG. 1.

There will be described hereinbelow a steering system for vehicles according to the preferred embodiment of the invention, which includes a basic steering system substantially equivalent to that of the known steering system described hereinabove. FIGS. 1 and 2 show the arrangement of the basic steering system, the function of which will be described in detail hereinbelow in conjunction with FIGS. 3a to 3c.

Referring first to FIG. 1, designated at reference numeral 1 is a steering wheel. The steering wheel 1 is fastened to the upper end of a steering shaft 2 assembled at the lower end thereof in a gearbox 3 of a rack and pinion type, which has a rack shaft 4 connected at each transverse end thereof through one of a pair of tie rods 5, 5 to one of a pair of knuckle arms 6, 6 each respectively supporting one of a pair of front wheels 7, 7, to be steered in the same steering direction as the steering wheel 1, whereby a known front-wheel steering mechanism is constituted.

The gearbox 3 further has a pinion shaft 8 rearwardly projected therefrom, the shaft 8 being connected at the rear end thereof through a universal joint 9 to the front end of a relatively long linkage shaft 10, which in turn is connected at the rear end thereof to a later-described input shaft of a rear-wheel steering mechanism, the input shaft extending along the longitudinal centerline of a vehicle body (not shown) and being rotatably supported by means of a bearing bracket 13 secured to the vehicle body. The rear end of the input shaft is connected through a bifurcated joint 14 to a swingable shaft 15 having at the longitudinally middle part thereof a joint member 16 loosely fitted thereon. The joint member 16 is connected at each transverse end thereof through one of a pair of ball joints 17, 17 to the inner end of one of a pair of tie rods 18, 18, while being transversely and vertically swingably suspended from the vehicle body by means of a pair of link plates 21, 22 supported by a bracket 23. The tie rods 18, 18 are each respectively connected at the outer end thereof to one of a pair of knuckle arms 19, 19 which support a pair of rear wheels 20, 20, respectively.

Referring now to FIG. 2, the swingable shaft 15 has, at the longitudinally intermediate part thereof, a rotary part 16a of the joint member 16 fixedly fitted thereon and, at the rear end thereof, an arm member 25 secured thereto at the upper end thereof so as to be kept perpendicular to the swingable shaft 15. To the lower end of the arm member 25 is pivotably connected the front end of a link 26, which in turn is pivotably connected at the rear end thereof to a slider 27 screw-feedably fitted, by means of a ball and screw mechanism 28 shown in FIGS. 3a to 3c, on an output shaft 30 of a control motor 29. The motor 29 is fixed to the vehicle body so that the output shaft 30 extends in alignment with the above-mentioned input shaft, which is designated at reference numeral 12 in FIG. 2.

Moreover, the vehicle has mounted thereon a microcomputer 31 adapted to receive data signals from both a vehicle speed sensor 32 for detecting the travelling speed of the vehicle and a slider position sensor 33 for detecting the screw-fed position of the slider 27, to thereby supply a proper control signal to the motor 29 in accordance with the vehicle speed.

In the above arrangement, a mechanism for changing the steered angle ratio of the rear wheels 20, 20 to the front wheels 7, 7 is constituted by the swingable shaft 15, the joint member 16, the arm member 25, the link 26, the slider 27, the motor 29, and the output shaft 30.

Figure 3A:
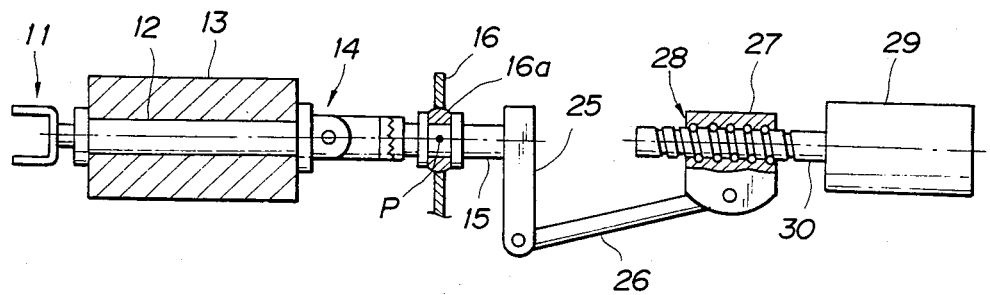
FIGS. 3a to 3c are longitudinal sectional side views, for functional explanation, of an essential part of the rear wheel steering mechanism of FIG. 2.
Figure 3B:
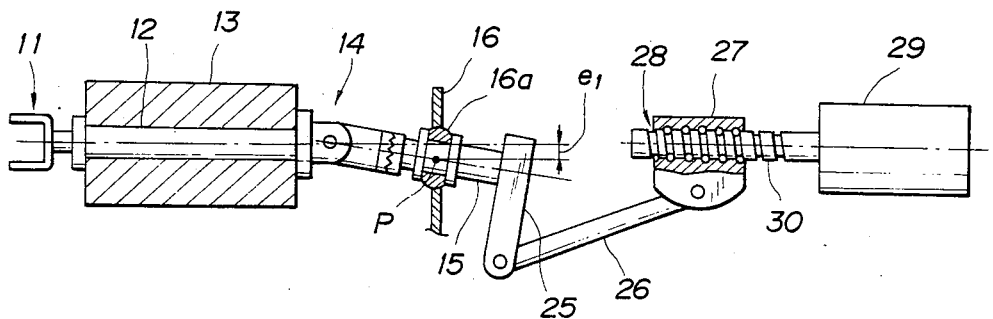
Figure 3C:
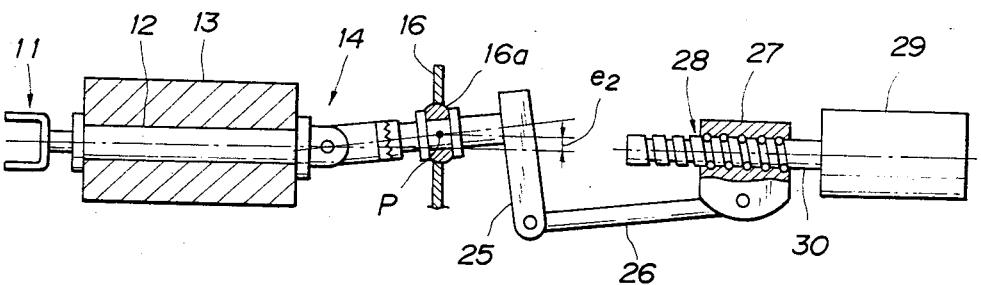

Referring now to FIGS. 3a to 3c, the steered angle ratio changing mechanism will be described below with respect to the function thereof in a substantially straight travelling condition of the vehicle.

When the vehicle speed is equal to a predetermined reference speed $d_1$ shown in FIG. 6, the slider 27 is located at a position shown in FIG. 3a and hence the joint member 16 has a pivot point P thereof on the extension of the axis of the input shaft 12. In such case, the swingable shaft 15 is permitted to coaxially rotate with the input shaft 12, so that even when the swingable sahft 15 is rotated the joint member 16 will not laterally swing, thus being kept from actuating the left and right rear tie rods 18, 18. Accordingly, when operated, the steering wheel 1 will steer only the front wheels 7, 7, leaving the rear wheels 20, 20 unsteered.

On the other hand, while the vehicle speed is lower than the reference speed $d_1$, the computer 31 receiving a corresponding signal from the vehicle speed sensor 32 makes a judgment, which causes the motor 29 to be controlled with respect to the number of revolutions thereof in response to the detected vehicle speed, whereby the slider 27 is advanced as shown in FIG. 3b from the position thereof in FIG. 3a. At such a low speed, the resultant advance of the slider 27 makes the swingable shaft 15 incline downwardly, thereby downwardly offsetting the pivot point P by a distance $e_1$ from the axis level of the input shaft 12. Accordingly, when operated, the steering wheel 1 causes the rotary part 16a of the joint member 16 to be laterally swung under a horizontal plane including the axis of the input shaft 12, thereby bringing the rear tie rods 18, 18 in the opposite direction to the front tie rods 5, 5, so that the rear wheels 20, 20 are steered oppositely to the front wheels 7, 7, while the steered angle ratio between the front and rear wheels 7, 7 and 20, 20 is substantially proportional to the offset distance $e_1$ which continuously varies depending on the vehicle speed.

To the contrary, while the vehicle speed is higher than the reference speed $d_1$, the computer 31 causes the motor 29 to be reversed in accordance with the vehicle speed, so that the slider 27 is retreated as shown in FIG. 3c from the position thereof in FIG. 3a. At such a high speed, the resultant retreat of the slider 27 makes the swingable shaft 15 incline upwardly, thereby upwardly offsetting the pivot point P by a distance $e_2$ from the axis level of the input shaft 12. Accordingly, when operated, the steering wheel 1 causes the rotary part 16a of the joint member 16 to be laterally swung under the horizontal plane including the axis of the input shaft 12, thereby bringing the rear tie rods 18, 18 in the same direction as the front tie rods 5, 5, so that the rear wheels 20, 20 are steered in the same direction as the front wheels 7, 7, while the steered angle ratio therebetween is substantially proportional to the offset distance $e_2$ which also continuously varies depending on the vehicle speed.

The computer 31 comprises a microcomputer system including, but not limited to, a plurality of integrated circuits (not shown) such as a CPU, a ROM, a RAM, and a plurality of peripheral interfaces.

According to such a basic steering system as above-described, at relatively low vehicle speeds a rear wheel is steered in the opposite direction to a front wheel, thus giving relatively small turning radii, improving the vehicle turning characteristics, and at relatively high vehicle speeds it is steered in the same direction as the front wheel, thus improving the steering responsiveness.

There will be described hereinbelow the essential arrangement as well as the function of a control part of the steering system according to the preferred embodiment, with reference to FIGS. 4 and 5.

Referring now to FIG. 4, designated at reference numeral 34 is an automatic constant-speed cruising device for holding constant the vehicle speed without the need of operating an acceleration pedal (not shown) when travelling on an expressway and the like. The cruising device 34 includes a throttle controlling actuator 35 in which, with a control signal S1 received from a control unit (not shown), a vacuum valve 36 for acceleration use and a vent valve 37 for deceleration use are controlled to be open or closed, whereby the negative pressure of an engine and the atmospheric pressure are alternatively introduced in a negative pressure chamber P of the actuator 35 and exerted on a diaphragm 38 thereof, thereby actuating a pedal link (not shown) fastened with the diaphragm 38, to control the throttle opening. Arrows P1 and P2 identify the flow of atmospheric pressure and that of negative pressure, respectively. The vacuum valve 36 is adapted to introduce the negative pressure when the control signal S1 is on, and shut off the same when it is off. On the other hand, the vent valve 37 is adapted to shut off the atmospheric pressure to thereby keep negative the inner pressure of the chamber P when the signal S1 is on, and introduce the same when it is off. Moreover, a safety valve 39 is provided for assisting deceleration such as when cancelling an acceleration command. The safety valve 39 shuts off the atmosphere when the signal S1 is on, and introduces the same when it is off. Incidentally, in FIG. 4, designated at reference numeral 40 is a vacuum accumulator, 41 is a filter, 42 is a check valve, 43 is a carburetor insulator, and 44 is a pedal link fastening portion of the diaphragm 38.

When the diaphragm 38 is caused to move to the left and right in FIG. 4 by the valves 36, 37, and 39, the pedal link fastening portion 44 moves together therewith, actuating the acceleration pedal to thereby control the vehicle speed.

The throttle controlling actuator 35 is provided with an output control device, or more particularly, with a valve drive 45 governing the vacuum valve 36 and the vent valve 37. The valve drive 45 is controlled with a command signal S2 output from the computer 31, thereby driving the actuator 35 to control the throttle opening and hence the vehicle speed.

Referring now to FIG. 5, the before-mentioned vehicle speed sensor 32 detecting a vehicle speed $u_1$ the vehicle actually has provides an actual-speed signal representing the actual vehicle speed $u_1$ to be input to the computer 31, while the slider position sensor 33 detecting a steered angle ratio k the vehicle actually has provides an actual-ratio signal representing the actual steered angle ratio k to be input to the computer 31. In the computer 31, the actual-ratio signal is subjected to a conversion A, which gives a converted-speed signal representing a vehicle speed $u_2$ as converted from the actual steered angle ratio k. By means of a comparison B, the actual-speed signal and the converted-speed signal are processed to obtain a relative difference $\Delta u$ with respect to the values of the actual and converted vehicle speeds $u_1$ and $u_2$, $\Delta u = (u_1 - u_2)$. Then, the difference $\Delta u$ is compared with a reference value $f(u_1)$ as a function of the actual vehicle speed $u_1$, to judge whether $\Delta u > f(u_1)$ or $\Delta u = f(u_1)$, for a decision C that the vehicle speed should be decreased in case $\Delta u > f(u_1)$ and maintained constant in case $\Delta u = f(u_1)$. Accordingly, in the latter case, the command signal S2 is output from the computer 31 to the valve drive 45, to thereby drive the actuator 35, controlling the throttle opening as described above.

The foregoing processes in the computer 31 are exercised by following a control program stored in the ROM as a memory of the microcomputer system.

Incidentally, in the steering system according to the preferred embodiment, the process to obtain the relative difference $\Delta u$ with respect to the actual and converted vehicle speeds $u_1$ and $u_2$ is put into effect only when the travelling condition of the vehicle, as it is detected, gives a transverse acceleration in excess of a predetermined value.

As will be understood from the foregoing description, in a steering system according to the present invention, even under the setting condition that a relative deviation appears between the vehicle speed the vehicle actually has and a converted vehicle speed based on the steered angle ratio the vehicle actually has, the vehicle speed is automatically controlled while the deviation is larger than a predetermined value, i.e., it is decreased or held constant, whereby a proper steering operation is always permitted, thus remarkably improving the vehicle turning characteristics.

Moreover, in the steering system according to the preferred embodiment, as a means for controlling the vehicle speed from the computer 31, there may be employed a braking device instead of the throttle controlling actuator 35. Further, in place of the vehicle-oriented computer 31, there may be employed an electric or electronic circuit with a similar function.

Furthermore, as reference value $f(u_1)$ as a function of the actual vehicle speed $u_1$, there may be employed a proper constant or a set of proper constants.

Still further, the present invention may be embodied as a steering system including front and rear wheels having hydraulically controlled steering in which information on the steered angle of the front wheel is hydraulically transmitted, or as a steering system in which the steered angle of a front wheel is directly informed to a computer by means of an electric signal.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

I claim:

1. In a steering system for vehicles, in which a rear wheel is steerable in relation to the steering operation of a front wheel, and the steered angle ratio of said rear wheel to said front wheel is controlled in accordance with the vehicle speed, an improvement comprising deviation detecting means for detecting the relative deviation between the steered angle ratio the vehicle actually has and a steered angle ratio set in accordance with the vehicle speed, and speed control means for controlling to decrease or hold constant the vehicle speed when said relative deviation is larger than a predetermined value.

2. A steering system according to claim 1, wherein said speed control means comprises a throttle controlling actuator.

3. In a steering system for vehicles including a steering wheel, a front wheel, front steering means for steering said front wheel, a rear wheel, rear steering means for steering said rear wheel, ratio changing means for changing the steered angle ratio of said rear wheel to said front wheel, control means for controlling said ratio changing means, ratio detecting means for detecting the steered angle ratio, said ratio detecting means cooperating with said control means, speed detecting means for detecting the vehicle speed, and said speed detecting means cooperating with said control means, in which said rear wheel is steered at relatively low vehicle speeds in the opposite direction to said front wheel or substantially at an angle of zero degree and at relatively high vehicle speeds in the same direction as said front wheel, and the correction of the steered angle ratio in accordance with the vehicle speed is permitted only when the vehicle is in a substantially straight travelling condition, an improvement comprising a speed control mechanism operatively connected to said control means and controlled therewith, so that the vehicle speed is reduced or held constant when the relative deviation between the vehicle speed the vehicle actually has and a converted vehicle speed obtained from the steered angle ratio the vehicle actually has is larger than a predetermined reference value.

4. A steering system according to claim 3, wherein said speed control mechanism comprises a throttle controlling actuator.

5. A steering system according to claim 3, wherein said speed control mechanism is controlled such that the vehicle speed is held constant when said relative deviation is equal to said predetermined reference value and decreased when said relative deviation is larger than the same.

6. A steering system according to claim 5, wherein said predetermined reference value is a function of the vehicle speed the vehicle actually has.

7. A steering system according to claim 5, wherein said predetermined reference value is a constant.

* * * * *